(12) United States Patent
Johnson

(10) Patent No.: US 11,013,254 B1
(45) Date of Patent: May 25, 2021

(54) FOOD-COATING DEVICE

(71) Applicant: Layton Johnson, Fayetteville, NC (US)

(72) Inventor: Layton Johnson, Fayetteville, NC (US)

(*) Notice: Subject to any disclaimer, the term of this patent is extended or adjusted under 35 U.S.C. 154(b) by 30 days.

(21) Appl. No.: 16/659,631

(22) Filed: Oct. 22, 2019

(51) Int. Cl.
| | |
|---|---|
| *A23P 20/13* | (2016.01) |
| *A23G 3/20* | (2006.01) |
| *A23G 3/26* | (2006.01) |
| *B05C 3/08* | (2006.01) |
| *A61J 3/00* | (2006.01) |
| *B05C 19/00* | (2006.01) |
| *A47J 37/04* | (2006.01) |
| *B01J 2/12* | (2006.01) |
| *B01J 2/14* | (2006.01) |

(52) U.S. Cl.
CPC .......... *A23P 20/13* (2016.08); *A23G 3/2076* (2013.01); *A23G 3/26* (2013.01); *B01J 2/12* (2013.01); *B01J 2/14* (2013.01); *B05C 3/08* (2013.01); *A47J 37/047* (2013.01); *A61J 3/005* (2013.01); *B05C 19/00* (2013.01)

(58) Field of Classification Search
CPC . A23P 20/13; A23P 20/12; A23G 3/02; A23G 3/2076; A23G 3/26; B05C 3/08; B05C 19/00; B05C 19/06; A61J 3/005; B01J 2/12; B01J 2/14; B01J 2/006; A23L 13/57; A23L 13/03; A47J 37/047
USPC .............. 118/13, 19, 24, 26, 303, 417, 418; 99/494
See application file for complete search history.

(56) References Cited

U.S. PATENT DOCUMENTS

| | | | | |
|---|---|---|---|---|
| 2,334,919 | A | * | 11/1943 | Godfrey ................. A01J 15/08 366/225 |
| 2,573,296 | A | | 10/1951 | Perry |
| 3,739,743 | A | | 6/1973 | Mc |
| 5,134,956 | A | | 8/1992 | Stewart |
| 5,704,711 | A | | 1/1998 | Simmons |
| 6,220,744 | B1 | | 4/2001 | Blackhurst |
| 6,712,498 | B1 | | 3/2004 | Yang |
| 7,229,204 | B2 | | 6/2007 | Haskell |
| 7,350,965 | B2 | | 4/2008 | Galeczka |
| 2007/0196547 | A1 | * | 8/2007 | King ....................... A23P 20/13 426/302 |
| 2015/0023123 | A1 | | 1/2015 | Biorac |
| 2018/0008656 | A1 | * | 1/2018 | Watts ........................ B07B 1/24 |

FOREIGN PATENT DOCUMENTS

WO 9817451 4/1998

* cited by examiner

*Primary Examiner* — Laura Edwards
(74) *Attorney, Agent, or Firm* — Kyle A. Fletcher, Esq.

(57) ABSTRACT

The food-coating device comprises a drum, a rolling stand, and a motor. The drum may apply a breading mixture to a plurality of food items. The plurality of food items and the breading mixture may be placed within the drum. The drum may be spun by the motor to tumble the plurality of food items and the breading mixture such that the plurality of food items are coated with the breading mixture. The drum and the motor may be supported by the rolling stand. A door may pivot open to provide access to the interior of the drum. A door gasket may seal the door when the door is closed.

16 Claims, 4 Drawing Sheets

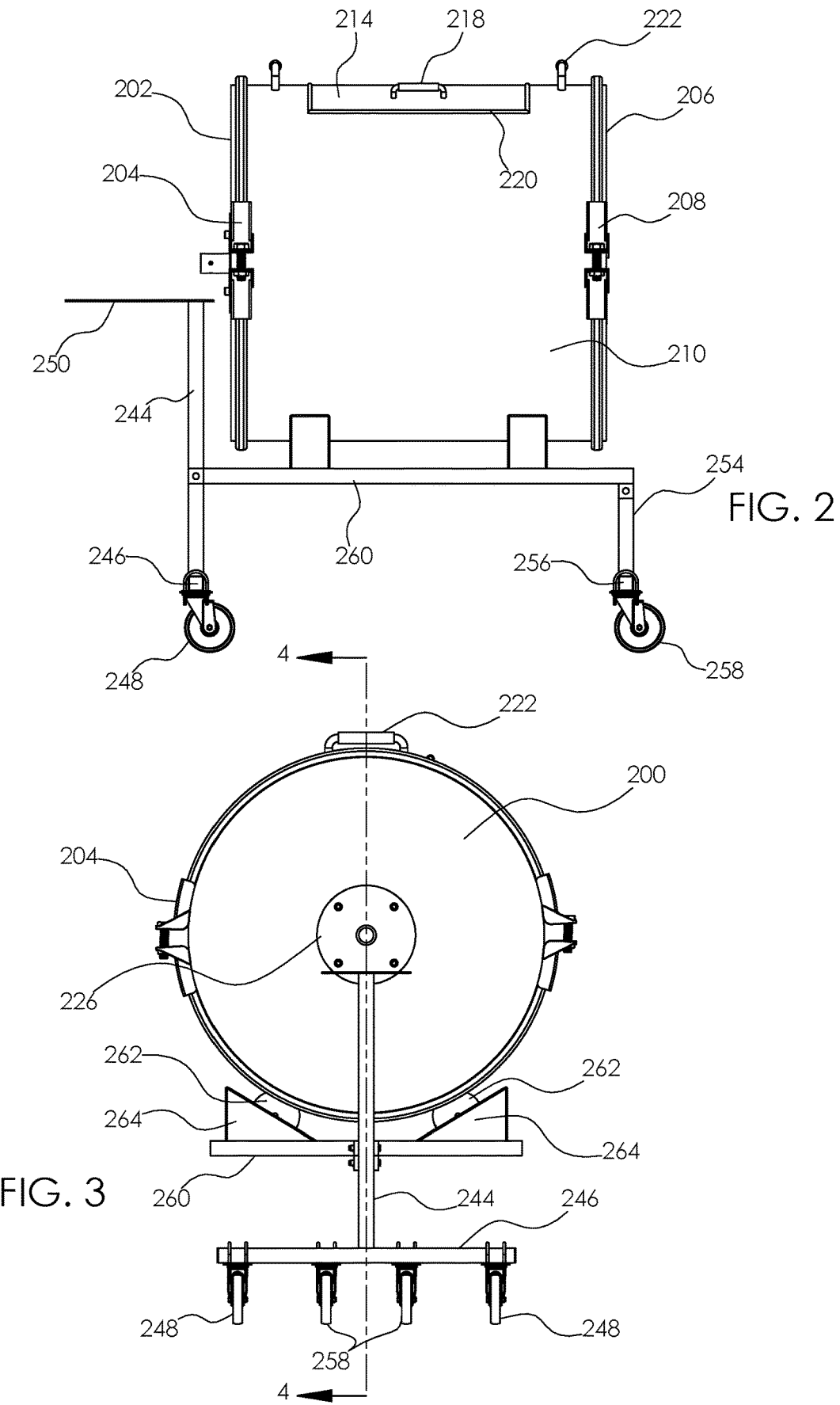

FOOD-COATING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of culinary equipment, more specifically, a food-coating device.

SUMMARY OF INVENTION

The food-coating device comprises a drum, a rolling stand, and a motor. The drum may apply a breading mixture to a plurality of food items. The plurality of food items and the breading mixture may be placed within the drum. The drum may be spun by the motor to tumble the plurality of food items and the breading mixture such that the plurality of food items are coated with the breading mixture. The drum and the motor may be supported by the rolling stand. A door may pivot open to provide access to the interior of the drum. A door gasket may seal the door when the door is closed.

An object of the invention is to tumble food items and breading mixture within a drum such that the breading mixture coats the food items.

Another object of the invention is to provide a rolling stand that allows the food-coating device to be moved within a work area.

A further object of the invention is to provide a motor to turn the drum.

Yet another object of the invention is to provide a hinged door for accessing the interior of the drum.

These together with additional objects, features and advantages of the food-coating device will be readily apparent to those of ordinary skill in the art upon reading the following detailed description of the presently preferred, but nonetheless illustrative, embodiments when taken in conjunction with the accompanying drawings.

In this respect, before explaining the current embodiments of the food-coating device in detail, it is to be understood that the food-coating device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food-coating device.

It is therefore important that the claims be regarded as including such equivalent construction insofar as they do not depart from the spirit and scope of the food-coating device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an embodiment of the disclosure.

FIG. 3 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
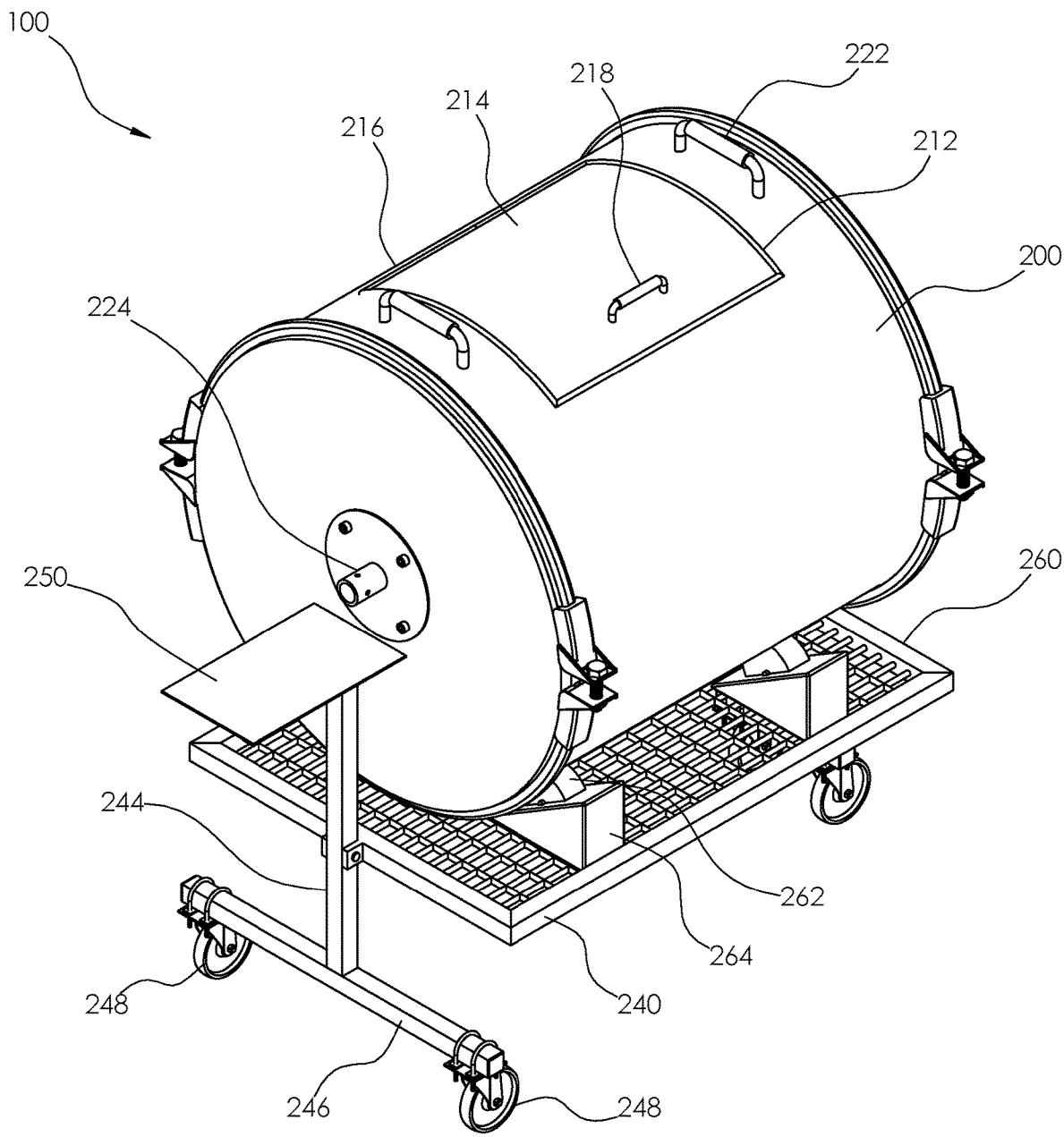
FIG. 1 is an isometric view of an embodiment of the disclosure.
Figure 4:
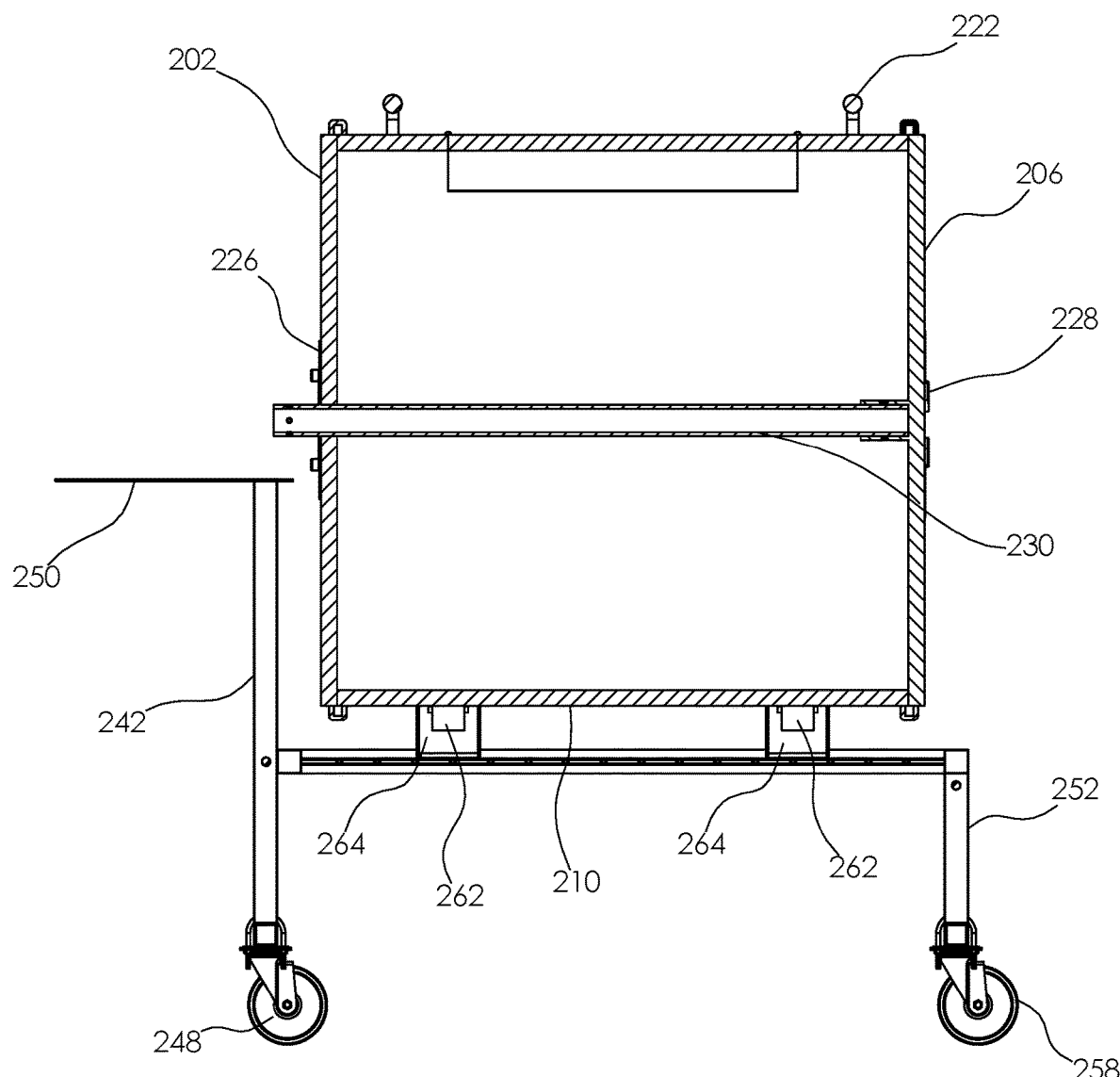
FIG. 4 is a cross-sectional view of an embodiment of the disclosure across 4-4 as shown in FIG. 3.
Figure 5:
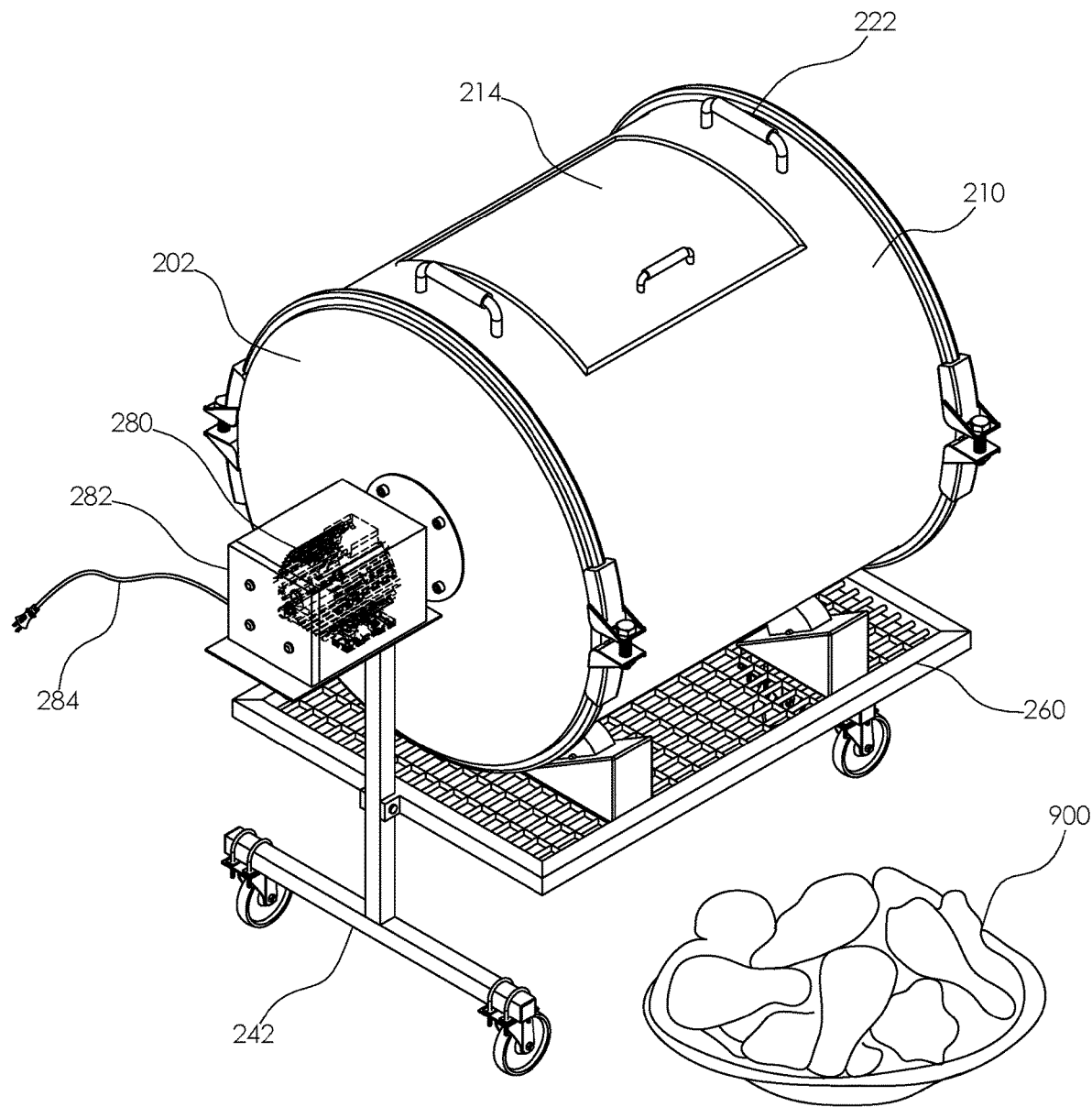
FIG. 5 is an in-use view of an embodiment of the disclosure.

Detailed reference will now be made to a first potential embodiment of the disclosure, which is illustrated in FIGS. 1 through 5.

The food-coating device 100 (hereinafter invention) comprises a drum 200, a rolling stand 240, and a motor 280. The drum 200 may apply a breading mixture to a plurality of food items 900. The plurality of food items 900 and the breading mixture may be placed within the drum 200. The drum 200 may be spun by the motor 280 to tumble the plurality of food items 900 and the breading mixture such that the plurality of food items 900 are coated with the breading mixture. The drum 200 and the motor 280 may be supported by the rolling stand 240.

The drum 200 may comprise a left wall 202, a right wall 206, a cylindrical wall 210, a drum aperture 212, a door 214, one or more drum handles 222, and a motor coupling 224. The drum 200 may be a hollow container into which the plurality of food items 900 and the breading mixture may be placed. The left wall 202 and the right wall 206 may be circular ends of the drum 200. The cylindrical wall 210 may complete the container by joining the periphery of the left wall 202 to the periphery of the right wall 206.

In some embodiments, the left wall 202 and the right wall 206 may removably couple to the cylindrical wall 210. The left wall 202 may removably couple to the cylindrical wall 210 using a left clamp 204. The right wall 206 may removably couple to the cylindrical wall 210 using a right clamp 208.

Throughout this document, the terms "left" and "right" are used to clarify the description by proving reference directions for at least one embodiment of the invention 100. Those of ordinary skill in the art will recognize that alternative embodiments which reverse the orientation of the invention 100 are possible and that those alternative embodiments which reverse left and right may be regarded as including such equivalent construction insofar as they do not depart from the spirit and scope of the invention 100 described herein.

The cylindrical wall 210 may comprise the drum aperture 212. The drum aperture 212 may provide access to the interior of the drum 200. The drum aperture 212 may be covered by the door 214 to prevent the plurality of food items 900 and the breading mixture from falling out of the drum 200 while the drum 200 spins. The door 214 may comprise a door hinge 216, a door handle 218, and a door gasket 220.

The door hinge 216 may pivotably couple the door 214 to the cylindrical wall 210 adjacent to the drum aperture 212. The door hinge 216 may be operable to pivot the door 214 between an open position that exposes the drum aperture 212 and a closed position that covers the drum aperture 212. The door handle 218 may be a grasping point for pivoting the door 214. The door handle 218 may be coupled to the door 214 in a position that is opposite the door hinge 216.

The door gasket 220 may seal the drum aperture 212 when the door 214 is in the closed position. The door gasket 220 may be an elastic material that lines the drum aperture 212. The door gasket 220 may compress between the edge of the drum aperture 212 and the door 214 when the door 214 is in the closed position.

The one or more drum handles 222 may be grasping points for lifting and manipulating the drum 200. The one or more drum handles 222 may be coupled to the outside of the cylindrical wall 210 of the drum 200.

The motor coupling 224 may comprise a left shaft support 226, a right shaft support 228, and a shaft 230. The motor coupling 224 may detachably couple to the motor 280 such that the motor 280 may spin the drum 200. The left shaft support 226 may be coupled to the left wall 202 such that the center of the left shaft support 226 aligns with the center of the left wall 202. The right shaft support 228 may be coupled to the right wall 206 such that the center of the right shaft support 228 aligns with the center of the right wall 206. The shaft 230 may pass through the center of the drum 200. The right end of the shaft 230 may couple to the right shaft support 228. The left end of the shaft 230 may pass through the left shaft support 226 and may couple to the left shaft support 226 at the center of the left shaft support 226. The left end of the shaft 230 may extend outside of the drum 200 such that the motor 280 may be coupled to the shaft 230. Rotation of the shaft 230 may cause rotation of the drum 200.

The rolling stand 240 may comprise a left support 242, a right support 252, and a drum platform 260. The drum 200 may be transported within a work area by the rolling stand 240

The left support 242 may support the left side of the drum platform 260 and a motor platform 250. The left support 242 may comprise a left upright 244, a left wheel bar 246, a pair of left wheels 248, and the motor platform 250. The left upright 244 and the left wheel bar 246 may form an inverted-T shaped armature on the left side of the rolling stand 240. The left wheel bar 246 may be oriented to run horizontally from front to rear. The pair of left wheels 248 may be coupled to the underside of the left wheel bar 246 at each end of the left wheel bar 246. The left upright 244 may extend vertically from the top center of the left wheel bar 246. The top of the left upright 244 may be coupled to the motor platform 250. The drum platform 260 may be coupled to a midpoint of the left upright 244.

The motor platform 250 may be a horizontally oriented plate coupled to the top of the left support 242. The motor platform 250 may support the motor 280 and a motor housing 282.

The right support 252 may support the right side of the drum platform 260. The right support 252 may comprise a right upright 254, a right wheel bar 256, and a pair of right wheels 258. The right upright 254 and the right wheel bar 256 may form an inverted-T shaped armature on the right side of the rolling stand 240. The right wheel bar 256 may be oriented to run horizontally from front to rear. The pair of right wheels 258 may be coupled to the underside of the right wheel bar 256 at each end of the right wheel bar 256. The right upright 254 may extend vertically from the top center of the right wheel bar 256. The top of the right upright 254 may be coupled to the drum platform 260.

The drum platform 260 may be a horizontal shelf for supporting the drum 200. The drum platform 260 may be elevated above the floor by the left support 242 and the right support 252. The drum platform 260 may comprise a plurality of rollers 262 mounted to the drum platform 260 via a plurality of roller braces 264. The plurality of rollers 262 may support the drum 200 on the drum platform 260 while simultaneously allowing the drum 200 to spin. The plurality of rollers 262 may be dispersed on the left front, right front, left rear, and right rear of the drum platform 260. The plurality of rollers 262 may be positioned such that all of the plurality of rollers 262 contact the drum 200.

The motor 280 may convert electrical energy into mechanical energy. The motor 280 may cause rotation of the drum 200 when electrical energy is applied to the motor 280. The motor 280 may be powered by an electrical potential supplied to the motor 280 via a power cord 284. The motor 280 may be coupled to the shaft 230 when the drum 200 is placed on the drum platform 260. The motor 280 may be decoupled from the shaft 230 in order to remove the drum 200 from the drum platform 260. In some embodiment, the motor 280 may be enclosed within the motor housing 282 to protect the motor 280 from exposure to the breading mixture and to prevent injuries.

In use, the drum 200 may be placed upon the plurality of rollers 262 on the drum platform 260 and the door 214 may be pivoted to the open position. The plurality of food items 900 and the breading mixture may be placed inside the drum 200 via the drum aperture 212. The door 214 may be pivoted to the closed position. The power cord 284 may be plugged to energize the motor 280 and start the drum 200 spinning. The power cord 284 may be unplugged to stop the drum 200, the door 214 may be pivoted to the open position, and the plurality of food items 900, now coated with the breading mixture, may be removed from the drum 200 via the drum aperture 212. The drum 200 may be decoupled from the motor 280 and removed from the drum platform 260 for cleaning.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used herein, the words "couple", "couples", "coupled" or "coupling", refer to connecting, either directly or indirectly, and does not necessarily imply a mechanical connection.

As used in this disclosure, "drum" refers to a right circular cylinder or spool shaped object. The diameter of the drum refers to distance across the circular face of the drum. The circumference of the drum refers to the distance around the edge of the circular face of the drum. The length of the drum refers to the distance between the circular faces of the drum.

As used in this disclosure, "elastic" refers to a material or object that deforms when a force is applied to stretch or compress the material and that returns to its relaxed shape after the force is removed. A material that exhibits these qualities is also referred to as an elastomeric material.

As used herein, "energize" and/or "energization" refer to the application of an electrical potential to a system or subsystem.

As used herein, "food" refers to any substance that people or animals eat or drink, or that plants absorb.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "gasket" is an elastomeric material that is placed between a first surface and a second surface for the purpose of creating a liquid or gas impermeable seal between the first surface and the second surface or preventing the first surface from damaging the second surface (or vice versa).

As used in this disclosure, a "handle" is an object by which a tool, object, or door is held or manipulated with the hand.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "housing" is a rigid casing that encloses and protects one or more devices.

As used in this disclosure, the word "interior" is used as a relational term that implies that an object is located or contained within the boundary of a structure or a space.

As used herein, the words "invert", "inverted", or "inversion" refer to an object that has been turned inside out or upside down or to the act of turning an object inside out or upside down.

As used here, the word "midpoint" refers to a point that is between the ends of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge or farthest corner.

As used in this disclosure, a "motor" refers to a device that transforms energy from an external power source into mechanical energy.

As used in this disclosure, "orientation" refers to the positioning and/or angular alignment of a first object relative to a second object or relative to a reference position or reference direction.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, the term "shaft" is used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A food-coating device comprising:
a drum, a rolling stand, and a motor;
wherein the drum applies a breading mixture to a plurality of food items;
wherein the plurality of food items and the breading mixture are placed within the drum;
wherein the drum is spun by the motor to tumble the plurality of food items and the breading mixture such that the plurality of food items are coated with the breading mixture;
wherein the drum and the motor are supported by the rolling stand;
wherein the drum comprises a left wall, a right wall, a cylindrical wall, a drum aperture, a door, one or more drum handles, and a motor coupling;
wherein the drum is a hollow container into which the plurality of food items and the breading mixture are placed;
wherein the left wall and the right wall are circular ends of the drum;

wherein the cylindrical wall completes the container by joining the periphery of the left wall to the periphery of the right wall;
wherein the rolling stand comprises a left support, a right support, and a drum platform;
wherein the drum is transported within a work area by the rolling stand;
wherein the left support supports the left side of the drum platform and a motor platform;
the left support comprises a left upright, a left wheel bar, a pair of left wheels, and the motor platform;
wherein the left upright and the left wheel bar form an inverted-T shaped armature on the left side of the rolling stand;
wherein the left wheel bar is oriented to run horizontally from front to rear;
wherein the pair of left wheels are coupled to an underside of the left wheel bar at each end of the left wheel bar;
wherein the left upright extends vertically from a top center of the left wheel bar.

2. The food-coating device according to claim 1
wherein the left wall and the right wall removably couple to the cylindrical wall;
wherein the left wall removably couples to the cylindrical wall using a left clamp;
wherein the right wall removably couples to the cylindrical wall using a right clamp.

3. The food-coating device according to claim 2
wherein the cylindrical wall comprises the drum aperture;
wherein the drum aperture provides access to the interior of the drum;
wherein the drum aperture is covered by the door to prevent the plurality of food items and the breading mixture from falling out of the drum while the drum spins;
wherein the door comprises a door hinge, a door handle, and a door gasket.

4. The food-coating device according to claim 3
wherein the door hinge pivotably couples the door to the cylindrical wall adjacent to the drum aperture;
wherein the door hinge is operable to pivot the door between an open position that exposes the drum aperture and a closed position that covers the drum aperture;
wherein the door handle is a grasping point for pivoting the door;
wherein the door handle is coupled to the door in a position that is opposite the door hinge.

5. The food-coating device according to claim 4
wherein the door gasket seals the drum aperture when the door is in the closed position;
wherein the door gasket is an elastic material that lines the drum aperture;
wherein the door gasket compresses between an edge of the drum aperture and the door when the door is in the closed position.

6. The food-coating device according to claim 5
wherein the one or more drum handles are grasping points for lifting and manipulating the drum;
wherein the one or more drum handles are coupled to the outside of the cylindrical wall of the drum.

7. The food-coating device according to claim 6
wherein the motor coupling comprises a left shaft support, a right shaft support, and a shaft;
wherein the motor coupling detachably couples to the motor such that the motor spins the drum;
wherein the left shaft support is coupled to the left wall such that a center of the left shaft support aligns with the center of the left wall;
wherein the right shaft support is coupled to the right wall such that the center of the right shaft support aligns with the center of the right wall;
wherein the shaft passes through the center of the drum;
wherein the right end of the shaft couples to the right shaft support;
wherein the left end of the shaft passes through the left shaft support and couples to the left shaft support at the center of the left shaft support;
wherein the left end of the shaft extends outside of the drum;
wherein rotation of the shaft causes rotation of the drum.

8. The food-coating device according to claim 7
wherein a top of the left upright is coupled to the motor platform.

9. The food-coating device according to claim 8
wherein the drum platform is coupled to a midpoint of the left upright.

10. The food-coating device according to claim 9
wherein the motor platform is a horizontally oriented plate coupled to the top of the left support;
wherein the motor platform supports the motor and a motor housing.

11. The food-coating device according to claim 10
wherein the right support supports the right side of the drum platform;
wherein the right support comprises a right upright, a right wheel bar, and a pair of right wheels;
wherein the right upright and the right wheel bar form an inverted-T shaped armature on the right side of the rolling stand;
wherein the right wheel bar is oriented to run horizontally from front to rear;
wherein the pair of right wheels are coupled to the underside of the right wheel bar at each end of the right wheel bar;
wherein the right upright extends vertically from the top center of the right wheel bar.

12. The food-coating device according to claim 11
wherein a top of the right upright is coupled to the drum platform.

13. The food-coating device according to claim 12
wherein the drum platform is a horizontal shelf for supporting the drum;
wherein the drum platform is elevated above flooring by the left support and the right support.

14. The food-coating device according to claim 13
wherein the drum platform comprises a plurality of rollers mounted to the drum platform via a plurality of roller braces;
wherein the plurality of rollers support the drum on the drum platform while simultaneously allowing the drum to spin;
wherein the plurality of rollers are dispersed on the left front, right front, left rear, and right rear of the drum platform;
wherein the plurality of rollers are positioned such that all of the plurality of rollers contact the drum.

15. The food-coating device according to claim 14
wherein the motor converts electrical energy into mechanical energy;
wherein the motor causes rotation of the drum when electrical energy is applied to the motor;

wherein the motor is powered by an electrical potential supplied to the motor via a power cord;

wherein the motor is coupled to the shaft when the drum is placed on the drum platform;

wherein the motor is decoupled from the shaft in order to remove the drum from the drum platform.

16. The food-coating device according to claim 15 wherein the motor is enclosed within the motor housing to protect the motor from exposure to the breading mixture and to prevent injuries.

* * * * *